United States Patent
Tamai et al.

[11] Patent Number: 5,819,200
[45] Date of Patent: Oct. 6, 1998

[54] METHOD AND APPARATUS FOR SELECTING A DESTINATION IN A VEHICLE NAVIGATION SYSTEM

[75] Inventors: Haruhisa Tamai, Sunnyvale; Hiroshi Nonaka; Masayuki Sekine, both of Cupertino, all of Calif.

[73] Assignee: Zexel Corporation, Tokyo, Japan

[21] Appl. No.: 601,216

[22] Filed: Feb. 14, 1996

[51] Int. Cl.[6] .................................................. G06F 165/00
[52] U.S. Cl. ......................... 701/208; 701/209; 340/990; 340/995
[58] Field of Search .................................. 701/200, 202, 701/207, 208, 209, 210; 73/178 R; 340/988, 990, 995

[56] References Cited

U.S. PATENT DOCUMENTS

| | | |
|---|---|---|
| 3,845,289 | 10/1974 | French . |
| 4,570,227 | 2/1986 | Tachi et al. . |
| 4,608,656 | 8/1986 | Tanaka et al. . |
| 4,611,293 | 9/1986 | Hatch et al. . |
| 4,672,565 | 6/1987 | Kuno et al. . |
| 4,673,878 | 6/1987 | Tsushima et al. . |
| 4,723,218 | 2/1988 | Hasebe et al. . |
| 4,734,863 | 3/1988 | Honey et al. . |
| 4,751,512 | 6/1988 | Longaker . |
| 4,782,447 | 11/1988 | Ueno et al. . |
| 4,796,191 | 1/1989 | Honey et al. . |
| 4,797,841 | 1/1989 | Hatch . |
| 4,831,563 | 5/1989 | Ando et al. . |
| 4,862,398 | 8/1989 | Shimizu et al. . |
| 4,914,605 | 4/1990 | Loughmiller, Jr. et al. . |
| 4,918,609 | 4/1990 | Yamawaki . |
| 4,926,336 | 5/1990 | Yamada . |
| 4,937,753 | 6/1990 | Yamada . |
| 4,964,052 | 10/1990 | Ohe . |
| 4,970,652 | 11/1990 | Nagashima . |
| 4,982,332 | 1/1991 | Saito et al. . |
| 4,984,168 | 1/1991 | Neukrichner et al. . |
| 4,989,151 | 1/1991 | Nuimura . |
| 4,992,947 | 2/1991 | Nuimura et al. . |
| 4,996,645 | 2/1991 | Schneyderberg Van der Zon . |
| 4,999,783 | 3/1991 | Tenmoku et al. . |
| 5,040,122 | 8/1991 | Neukirchner et al. . |
| 5,046,011 | 9/1991 | Kakihara et al. . |
| 5,059,965 | 10/1991 | Geiser ...................................... 340/995 |
| 5,060,162 | 10/1991 | Ueyama et al. . |
| 5,072,395 | 12/1991 | Bliss et al. ............................... 364/443 |
| 5,115,399 | 5/1992 | Nimura et al. ........................... 701/208 |
| 5,177,685 | 1/1993 | Davis et al. . |
| 5,283,743 | 2/1994 | Odagawa . |
| 5,287,297 | 2/1994 | Ihara et al. . |
| 5,297,050 | 3/1994 | Ichimura et al. . |
| 5,546,310 | 8/1996 | Ehdaie et al. ........................... 701/207 |

FOREIGN PATENT DOCUMENTS

| | | |
|---|---|---|
| 0 595 685 A1 | 5/1994 | European Pat. Off. . |
| WO 95/04340 | 2/1995 | WIPO . |

OTHER PUBLICATIONS

French, R.L., "MAP Matching Origins Approaches and Applications" Robert L. French & Associates, 3815 Lisbon St., Suite 201, Fort Worth, TX 76107, USA, pp. 91–116.

*Primary Examiner*—Gary Chin
*Attorney, Agent, or Firm*—Joseph M. Villeneuve; Beyer & Weaver, LLP

[57] ABSTRACT

A method and apparatus for selecting a destination in a vehicle navigation system are described. The vehicle navigation system includes a display and a selection control. A first destination is selected from a primary list of destinations in response to a selection signal generated by the selection control. The first destination is placed on a secondary list of destinations in response to its selection. The secondary list includes previously selected destinations from the primary list. For subsequent destination selections, the primary and secondary lists are presented on the display thereby facilitating selection of destinations from both the primary and secondary lists. A feature by which the system may search for a destination across categories is also described.

15 Claims, 9 Drawing Sheets

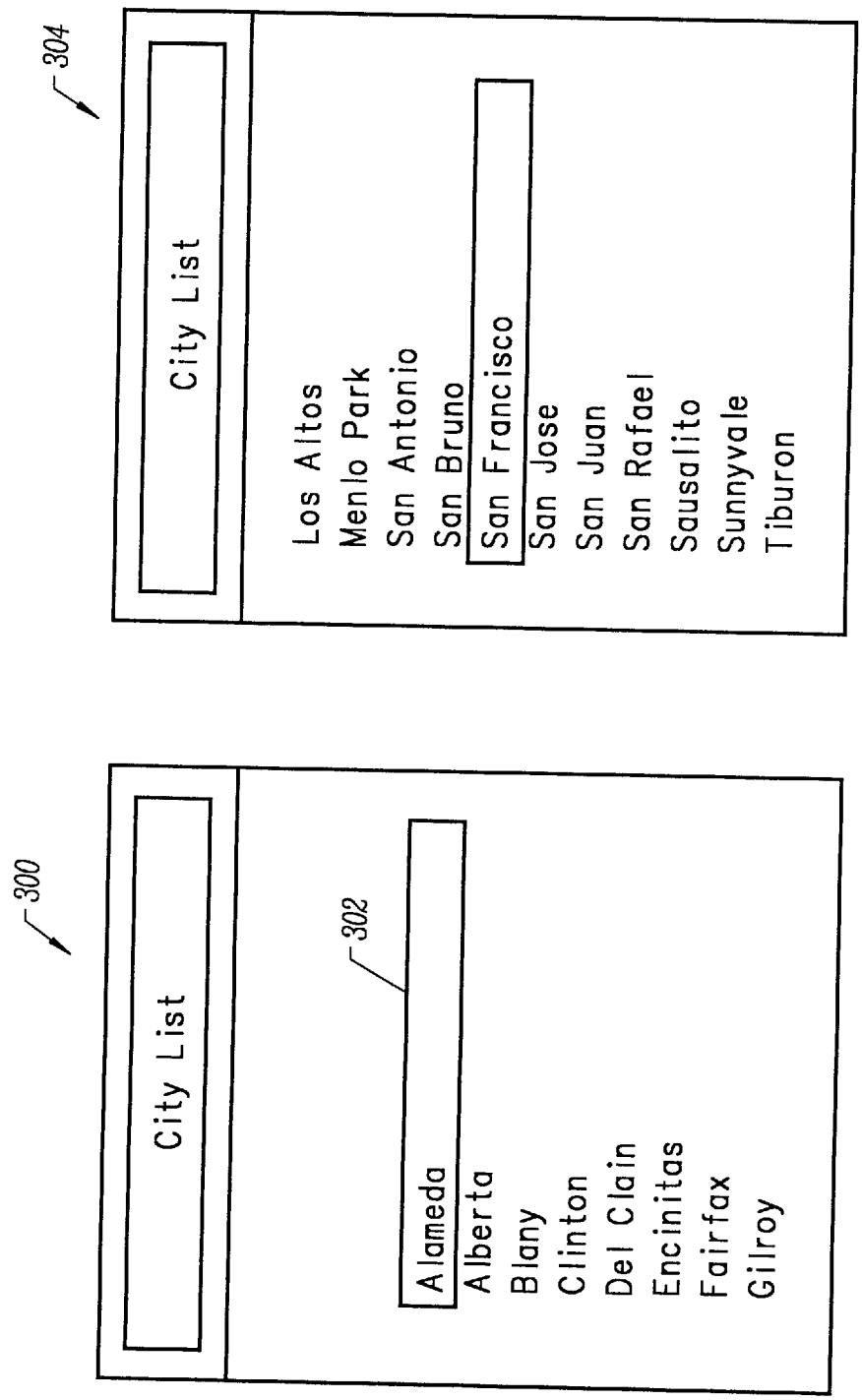

METHOD AND APPARATUS FOR SELECTING A DESTINATION IN A VEHICLE NAVIGATION SYSTEM

BACKGROUND OF THE INVENTION

The present invention relates to methods and apparatus for selecting a destination in a vehicle navigation system. More specifically, a vehicle navigation system designed according to the present invention maintains a destination selection history of the destinations most recently selected by the user and allows global searching for specific destinations across destination categories.

If the user of a vehicle navigation system is visiting a large metropolitan area with which she is not familiar, she is likely to need guidance from the navigation system each time she drives the vehicle in that area. Each time the user requests such guidance, she will have to step through the system's destination selection process, often repeating the same steps over and over again. For example, the user will need to designate the city within which she is traveling each time route guidance is desired. In particularly large cities, the same city is likely to be selected each time. The repetition of this step is inefficient and can become a source of irritation for the user.

In some currently available vehicle navigation systems, attempts have been made to avoid this inefficiency by making it easier for a user to select a previously selected destination. For example, according to one system, when the user is prompted to designate the city within which route guidance is desired the display cursor position is automatically placed on the most recently selected city. According to another system, the cursor is automatically placed on the city in which the vehicle is presently located. In each of these cases, if the highlighted city is the one for which guidance is currently needed, the user need only press enter to select the city.

However, some large metropolitan areas comprise many different cities. In such areas, if the user desires to travel between several of these cities, the above-described solutions provide no benefit. A vehicle navigation system is therefore desirable which allows a user to select from a plurality of previously selected destinations.

SUMMARY OF THE INVENTION

The present invention provides a solution to the above-described problems. Specifically, the present invention provides a means by which a list is maintained of the most recently selected destinations from any particular destination category (e.g., cities, streets, etc.). This list is presented at the beginning of the destination list for each such category thereby enabling the user to more easily select the user's most recently selected destinations without scrolling through the entire list for that category each time. Each time a destination is selected within a particular category, e.g., San Francisco in the city category, that destination is added to a finite list of the most recently selected destinations. The next time the user is prompted to select a destination in the particular category the list of most recently selected destinations will appear before the beginning of the entire list of destinations for the category. This allows the user to highlight and select any of these destinations with a minimum of cursor movement.

According to the invention, a method and apparatus for selecting a destination in a vehicle navigation system are described. A first destination is selected from a primary list of destinations in response to a selection signal generated by the navigation system's selection control. The first destination is then placed on a secondary list of destinations in response to its selection. The secondary list includes previously selected destinations from the primary list. For subsequent destination selections, the primary and secondary lists are both presented on the navigation system's display thereby facilitating selection of destinations from both the primary list and the list of previously selected destinations.

Another method and apparatus for selecting a destination in a vehicle navigation system is also described which allows the user to search for a destination across more than one category of destination, i.e., a global search. According to this embodiment, where a first selection signal corresponding to a first category is generated by the selection control, the display presents a first list of destinations corresponding to the first category. A first destination may then be selected from the first list in response to a second selection signal generated by the selection control. Alternatively, a second destination corresponding to an alphanumeric input may be found and selected by searching for the second destination across the categories of destinations in response to the alphanumeric input.

A further understanding of the nature and advantages of the present invention may be realized by reference to the remaining portions of the specification and the drawings.

BRIEF DESCRIPTION OF THE DRAWINGS

FIGS. 3a–3d show a series of display screens illustrating an embodiment of the present invention in which a destination selection history for a particular category of destination is maintained and displayed;

DESCRIPTION OF THE PREFERRED EMBODIMENT

The present invention relates generally to commonly assigned U.S. Pat. No. 5,345,382 for CALIBRATION METHOD FOR A RELATIVE HEADING SENSOR, issued on Sep. 6, 1994, U.S. Pat No. 5,359,529 for ROUTE GUIDANCE ON/OFF-ROUTE STATE FILTER, issued on Oct. 25, 1994, and U.S. Pat No. 5,374,933 for POSITION CORRECTION METHOD FOR VEHICLE NAVIGATION SYSTEM, issued on Dec. 20, 1994, the entire specifications of which are incorporated herein by reference.

Figure 1:
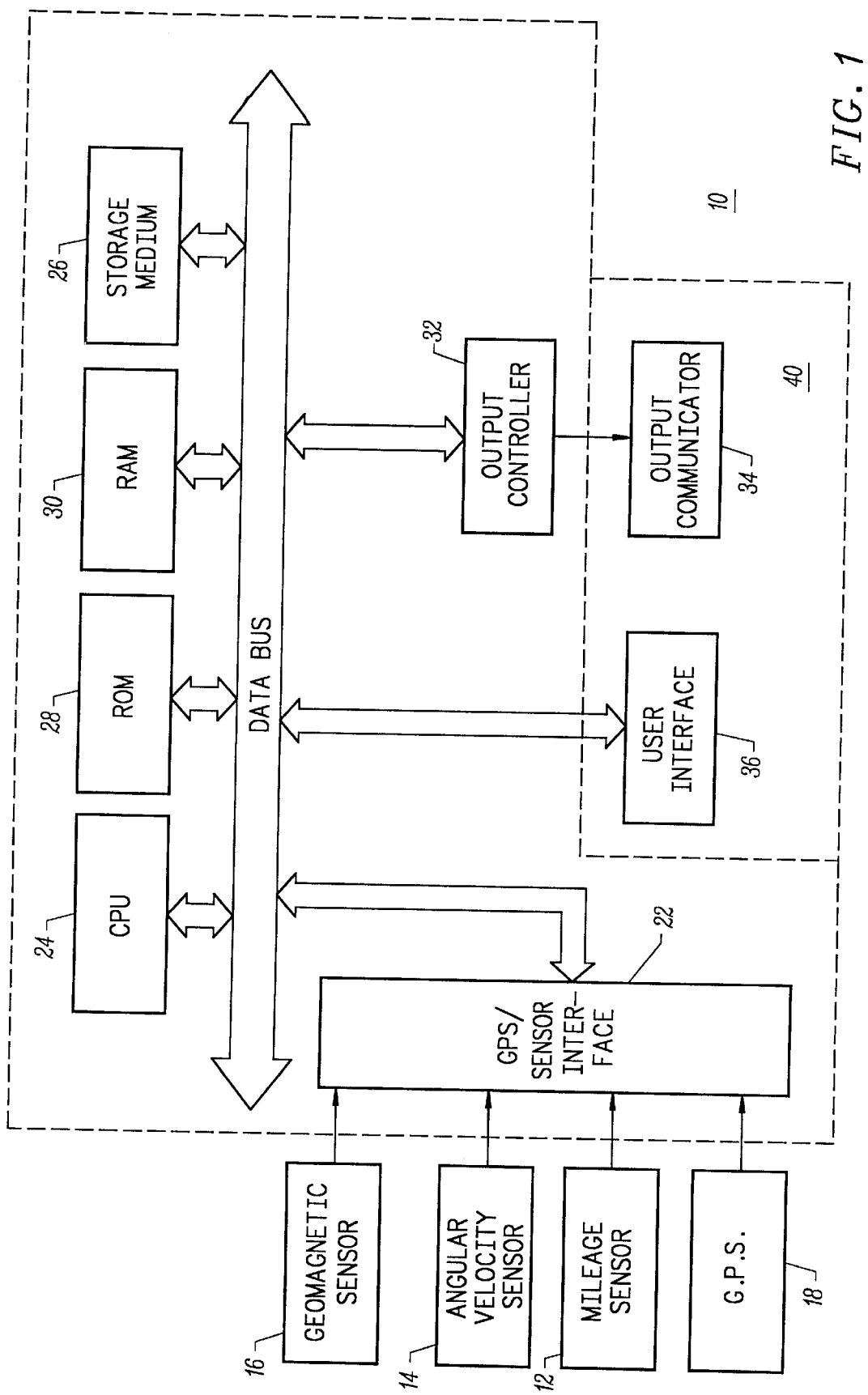
FIG. 1 is a block diagram of a specific embodiment of a vehicle navigation system for use with the present invention.

FIG. 1 is a block diagram of a specific embodiment of a vehicle navigation system 10 for use with the present invention. Sensors 12 to 16 and GPS receiver 18 are coupled to computing means 20 through sensor/GPS interface 22. In typical embodiments, the mileage sensor 12 comprises an odometer; the angular velocity sensor 14 comprises a gyroscope, or a differential odometer coupled to the wheels of the vehicle; and the geomagnetic sensor 16 usually comprises a magnetic compass mounted in the vehicle. A global positioning system (GPS) data receiver 18 is provided for receiving signals from, for example, a satellite-based navigation system. Data from sensor/GPS interface 22 is transmitted to CPU 24, which performs calibration, signal processing, dead-reckoning, vehicle positioning, and route guidance functions. A data base containing map information may be stored in storage medium 26, with software directing the operation of computing means 20 stored in ROM 28 for execution by CPU 24. RAM 30 permits reading and writing of the information necessary to execute such software programs. Storage medium 26 may comprise a hard disk drive, CD-ROM or integrated circuit onto which digitized map information has been stored. Output controller 32, which may comprise a graphics controller, receives data processed by CPU 24 and transmits such data to output communicator 34, usually comprising a display screen. The user may input data, such as a desired destination, through user interface 36, typically comprising an alphanumeric keyboard or keypad.

The map data base stored in storage medium 26 preferably comprises positional data such as, for example, latitude and longitude coordinates, to describe road intersections, road segments, landmarks and points of interest, and other geographical information. The data base may further comprise data representing characteristics of roads or places on the map, such as road and place names, road features such as dividers, one-way restrictions, surface, speed limit, shape, elevation, and other properties. Using the data stored in the map data base, the vehicle navigation system generates one or more possible positions of the vehicle by comparing the dead-reckoned position to the road segments, intersections, and other geographical locations stored in the data base. The system then filters the set of position possibilities and selects from the remaining position possibilities a position deemed to be the current position of the vehicle.

Figure 2:
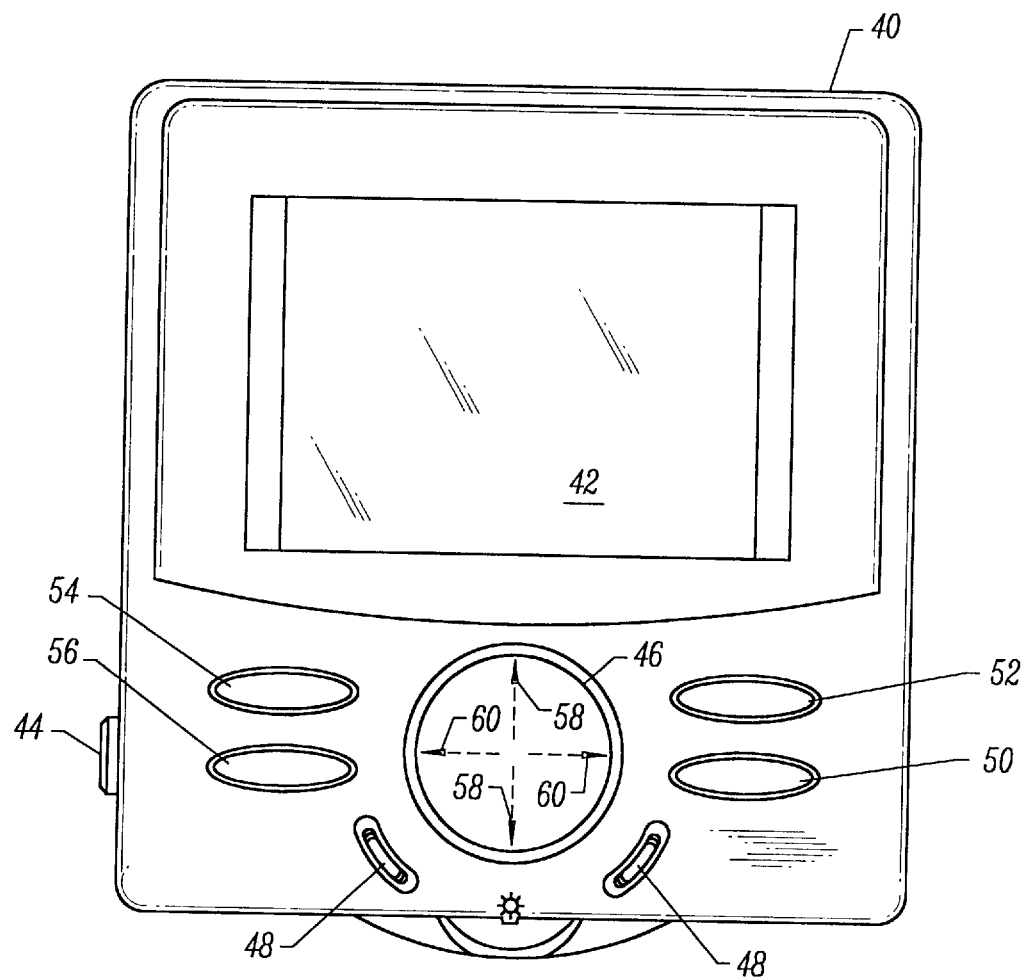
FIG. 2 is an illustration of a vehicle navigation system display console which may be employed with the present invention.

FIG. 2 is an illustration of a vehicle navigation system display console 40 which may be employed with the present invention. Console 40 has a display screen 42, a power switch 44, and seven function keys 46–56. A scrolling key 46 is centrally located below display screen 42 with two "Quick Scroll" keys 48 adjacent scrolling key 46 to its left and right. Scrolling key 46 controls the position of a cursor on display screen 42 during destination selection. "Quick Scroll" keys 48 both perform the same function which is to increase the speed with which scrolling key 46 scrolls through destination options on display screen 42. Enter key 50 allows the user of the vehicle navigation system to select the destination option currently highlighted by the cursor. Cancel key 52 allows the user to cancel the current operation and return to the previous step. Thus, if an incorrect destination is entered with enter key 50, cancel key 52 can be used to immediately correct the error. Route/Map key 54 allows the user to switch between two different route guidance modes. Option key 56 allows the user to reconfigure various features of the system set up.

Figure 3D:
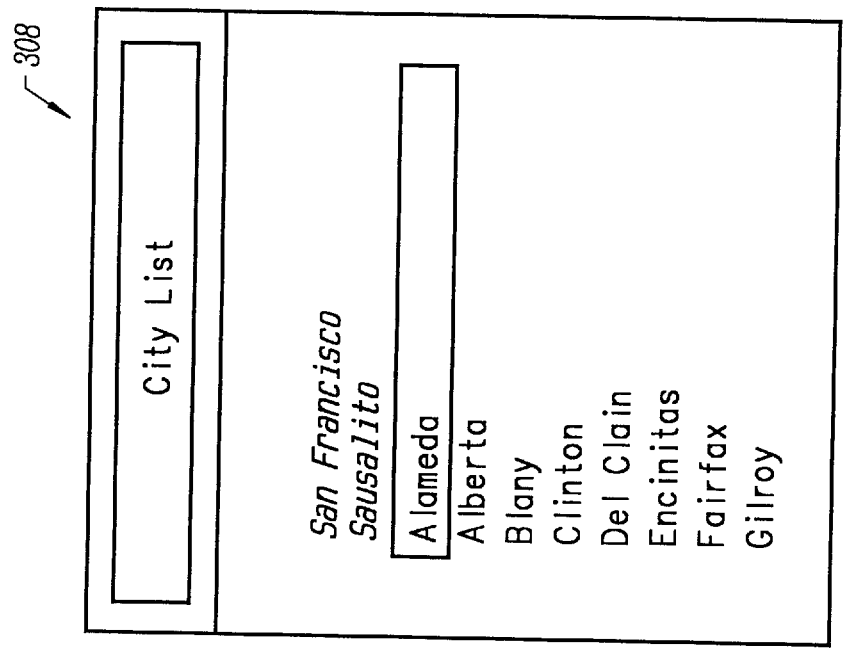

FIGS. 3a–3d show a series of display screens illustrating an embodiment of the present invention in which a destination selection history for a particular category of destination (in this example, cities) is generated. FIG. 3a shows a screen 300 which is presented to the user when first making a city selection. This "city list" is organized alphabetically. The user scrolls through the list using the display console scrolling keys until the desired city is highlighted by cursor 302. For example, in screen 304 of FIG. 3b, the user has scrolled through the city list and highlighted "San Francisco". One method and apparatus for scrolling through such a list which may be employed with the present invention is described in commonly assigned, copending U.S. patent application Ser. No. 08/477,495 for METHOD AND APPARATUS FOR SELECTING A DESTINATION IN A VEHICLE NAVIGATION SYSTEM, filed on Jun. 7, 1995, the entire specification of which is incorporated herein by reference.

Figure 3C:
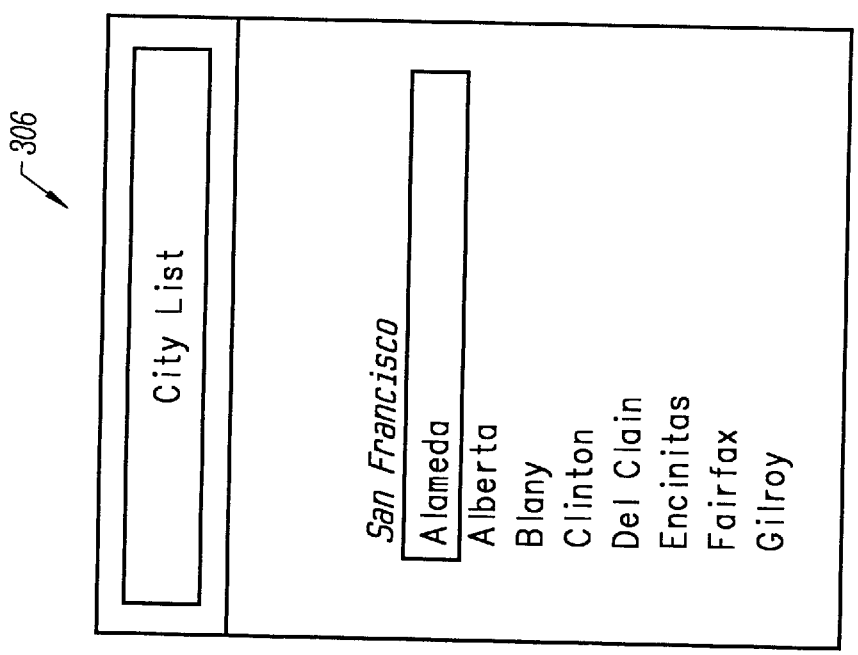

If the user selected San Francisco (i.e., the user pressed the enter key at screen 304), on the next occasion when the user is required to select a city from the city list, screen 306 of FIG. 3c is presented. The list of cities presented in screen 306 is the same as that presented in screen 300 except that the list is preceded by "San Francisco", the most recently selected city. In the figures, the previously selected destinations are shown in italics to distinguish them from the primary list of destinations. It will be understood that the list of previously selected destinations may be distinguished from the primary list by a variety of means without departing from the scope of the invention. For example, the list of previously selected destinations may differ in color from the primary list. Or, the two lists may be in different fonts, or differ in any of a wide variety of character attributes. In any case, because the two lists are initially presented to the user on the same screen, if San Francisco is the desired city, the user need only make one key stroke to highlight that choice.

Screen 308 of FIG. 3d indicates that both San Francisco and Sausalito are previously selected destinations. "Sausalito" is closer to the initial cursor position indicating that it is the more recently selected destination. In this way, the present invention maintains a selection history of previously selected destinations, allowing the user to select from the most recently selected destinations as well as the full list of destinations.

Figure 4:
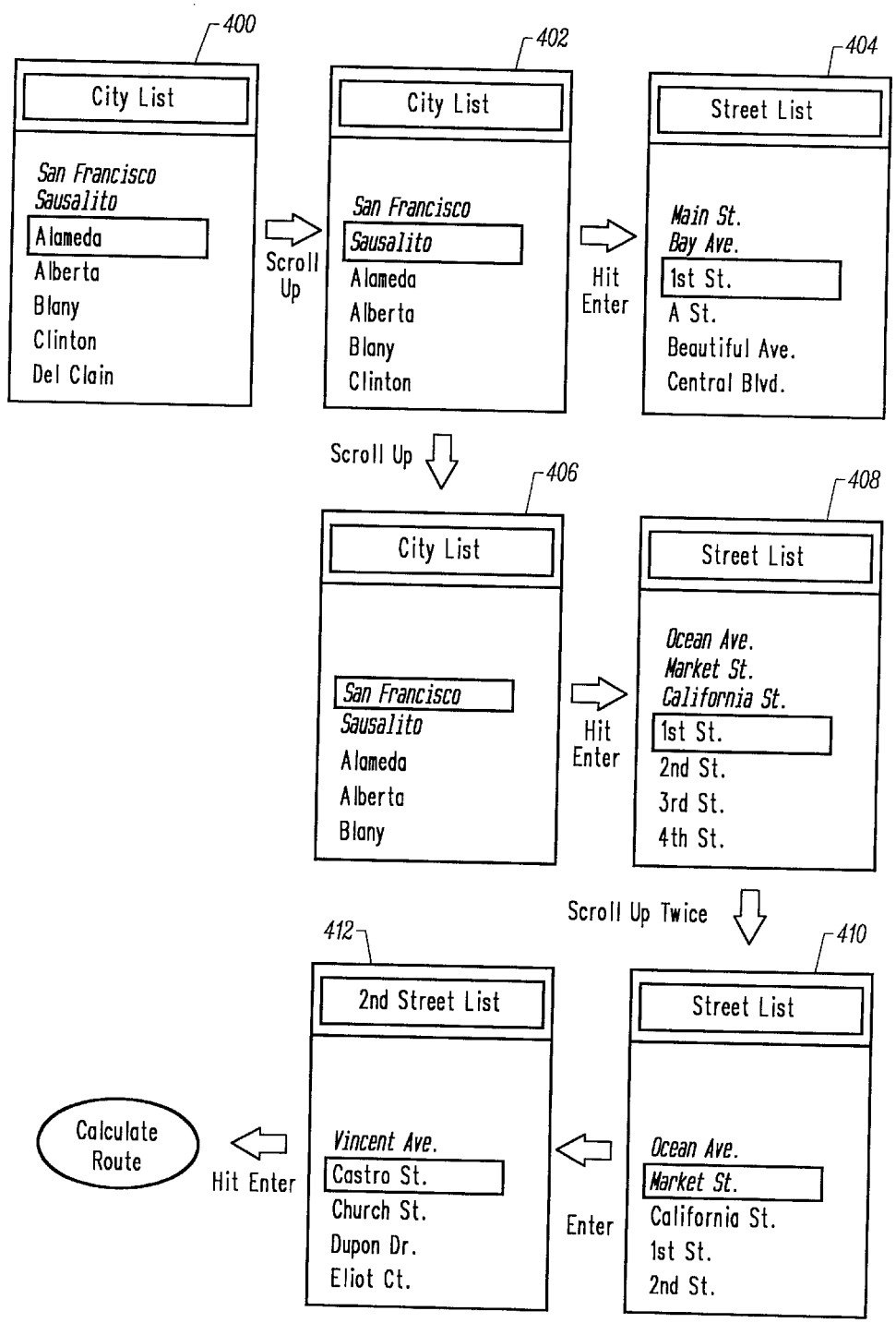
FIG. 4 shows a series of display screens illustrating an embodiment of the present invention in which destination selection histories are maintained and displayed for different categories of destinations.

It will be understood that the present invention is not limited to the selection of cities. According to specific embodiments, the present invention may be applied to more than one step of the destination selection process. That is, as the user steps through various levels of the destination selection process, a selection history is maintained for selected levels. FIG. 4 shows a series of display screens illustrating such an embodiment of the present invention in which destination selection histories are maintained for different categories of destinations. The destination selection process illustrated is one in which a street intersection is designated for route guidance. Screen 400 is similar to screen 308 of FIG. 3d. By scrolling up once, the user is presented with screen 402. If the user presses the enter key, a street list such as the one shown on screen 404 will appear presenting the streets of the selected city (i.e., Sausalito) in numerical and alphabetical order. As can be seen, Bay Ave. and Main St. have been selected previously and appear in italics preceding the full list of Sausalito streets.

If, on the other hand, Sausalito is not the desired destination, the user may scroll up once more from screen 402 and arrive at screen 406. Upon pressing the enter key, a street list for San Francisco will be presented as shown in screen 408. In this example, Ocean Ave., Market St., and California St. make up the selection history for San Francisco streets. By scrolling up twice, the user then arrives at screen 410 with "Market St." highlighted. Upon pressing enter at screen 410, a "2nd Street List" will appear (screen 412) which includes all San Francisco streets in the map database which intersect with the first selected street, in this case Market St. As shown, the most recently selected street intersecting with Market St. is Vincent Ave. If the user presses the enter key at screen 412, the vehicle navigation system will then proceed to calculate the route to the intersection of Market and Castro Streets in San Francisco.

In the above example, destination selection histories were maintained for each of the three different categories of destination, i.e., cities, streets, and second or intersecting streets, for a specific type of destination selection process. According to other embodiments of the invention, the same is done for other types of destination selection processes. For example, if a street address is the desired destination, selection history lists are presented with the city list and the street list. If a restaurant is the desired destination, selection history lists are presented with the city list and the restaurant list. It will be understood that, according to the present invention, such selection history lists may be maintained and presented with a variety of destination categories and destination selection processes.

Figure 5:
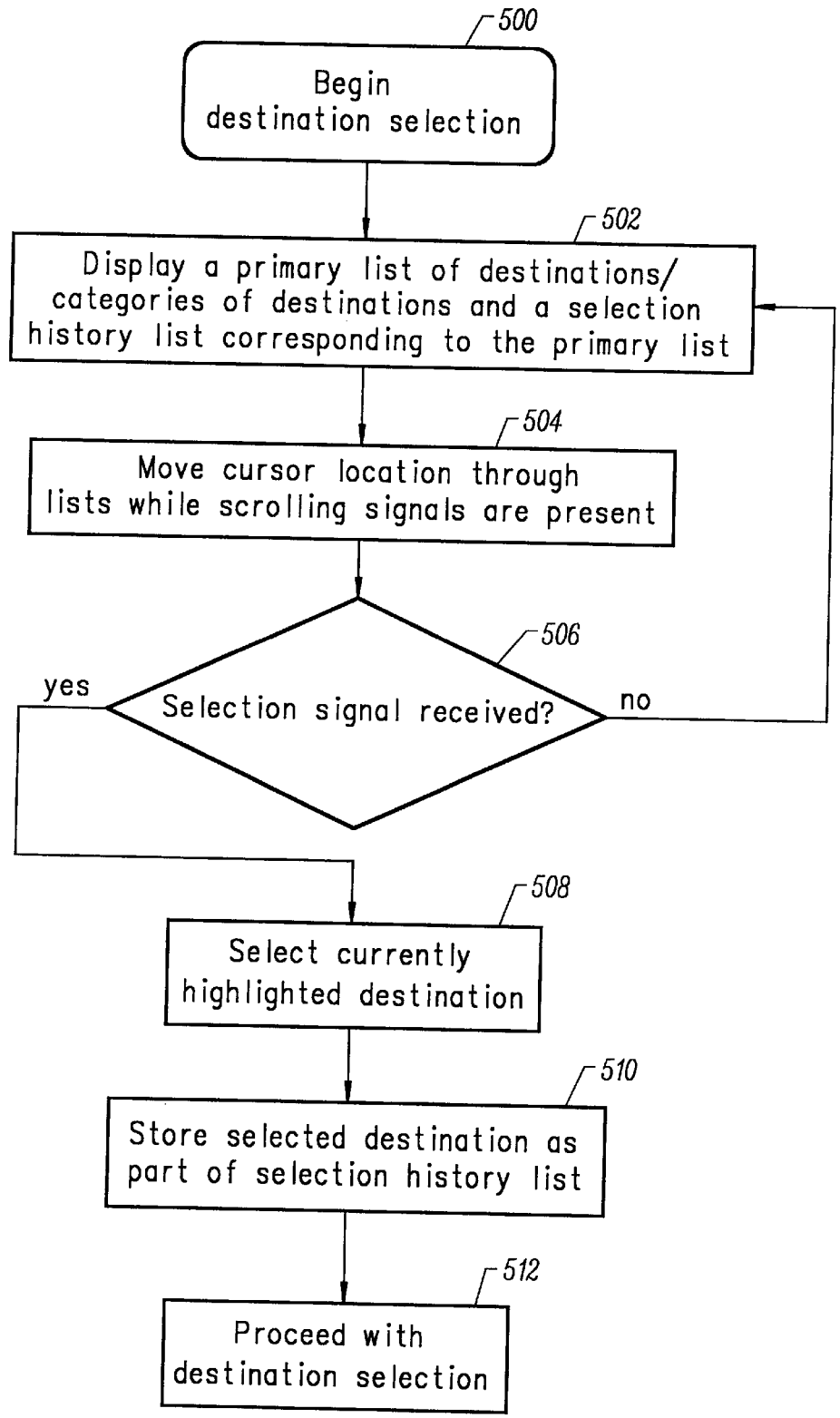
FIG. 5 is a flowchart illustrating a portion of a destination selection process in which a destination history list is generated.

FIG. 5 is a flowchart illustrating a portion of a destination selection process in which a destination history list is generated. As described above, after the destination selection process begins (step 500), at various junctures, the system displays a primary list of either destinations or categories of destinations along with a list of previously selected entries from that list, i.e., the selection history list (step 502). In response to signals from the scrolling keys on the display console, the cursor position is moved through the displayed lists (step 504). If a selection signal is received (step 506), the currently highlighted destination is selected for the next step in the destination selection process (step 508). The selected destination (or category) is then stored in the system's memory as part of the selection history list corresponding to the primary list and the destination selection process continues (steps 510 and 512).

Figure 6A:
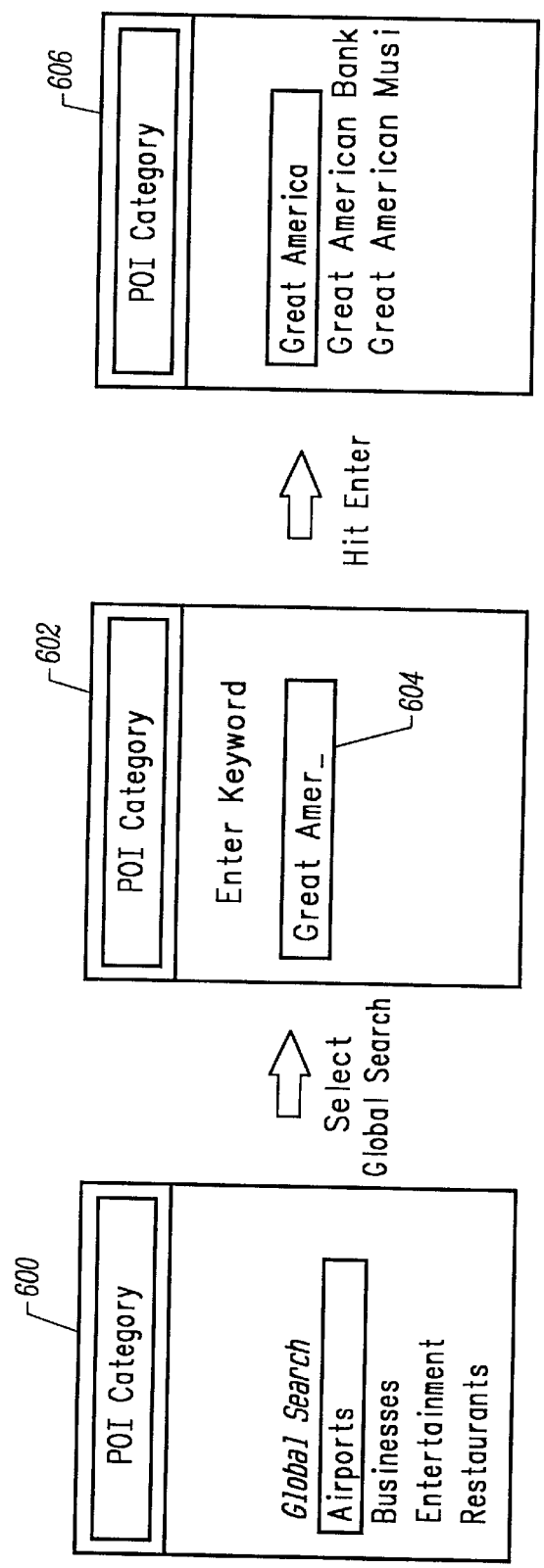
FIG. 6a shows a series of display screens illustrating an embodiment of the present invention in which a destination is selected using a global search across categories.

FIG. 6a shows a series of display screens illustrating an embodiment of the present invention in which a destination is selected using a global search across categories. In the specific embodiment shown, the categories are point of interest (POI) categories, i.e., airports, businesses, entertainment, restaurants, etc. When a user of the vehicle navigation system has chosen to select a destination by designating a point of interest, she is presented with a list of point of interest categories as shown in screen 600. The user may then select a particular category, or, if unsure of the category, the user may select the "Global Search" option and search for a particular destination across all POI categories. If the latter course is chosen, an alphanumeric input screen is presented to the user as shown in screen 602. The user may then input a string of alphanumeric characters in field 604 using the interface described with reference to FIGS. 1 and 2. After inputting the string "Great Amer" and pressing the enter key, the user is presented with all destinations in any of the POI categories corresponding to this string of characters (screen 606).

Figure 6B:
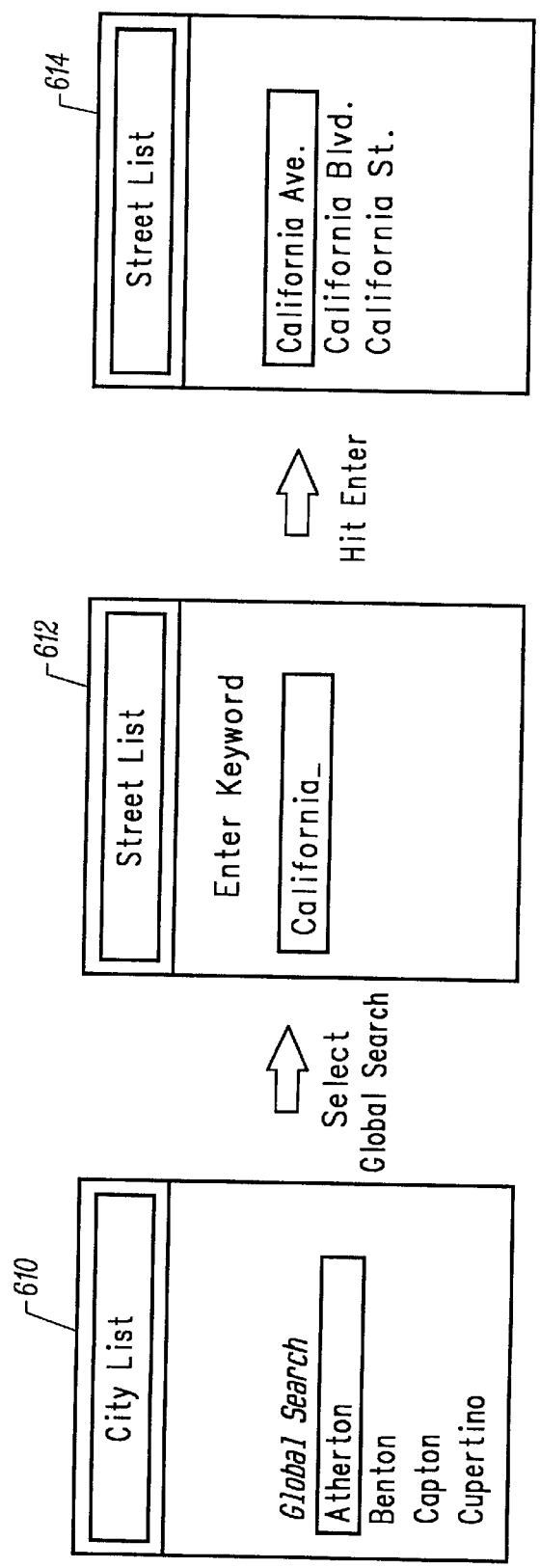
FIG. 6b shows a series of display screens illustrating another embodiment of the present invention in which a destination is selected using a global search across categories.

It will be understood that this embodiment of the invention may be employed to search across a variety of combinations of categories. For example, FIG. 6b shows a series of display screens illustrating an embodiment of the present invention in which a street name is selected using a global search across the city list. If the user knows only the street name, but not the city, she may select the global search option at screen 610 which leads to the presentation of alphanumeric input screen 612. After entering the street name, the system searches across all of the cities in the city list and returns any streets corresponding to the string of characters input by the user (screen 614). The cities in the city list may be thought of as categories with respect to the streets of each, i.e., San Francisco represents the streets of San Francisco.

Figure 7:
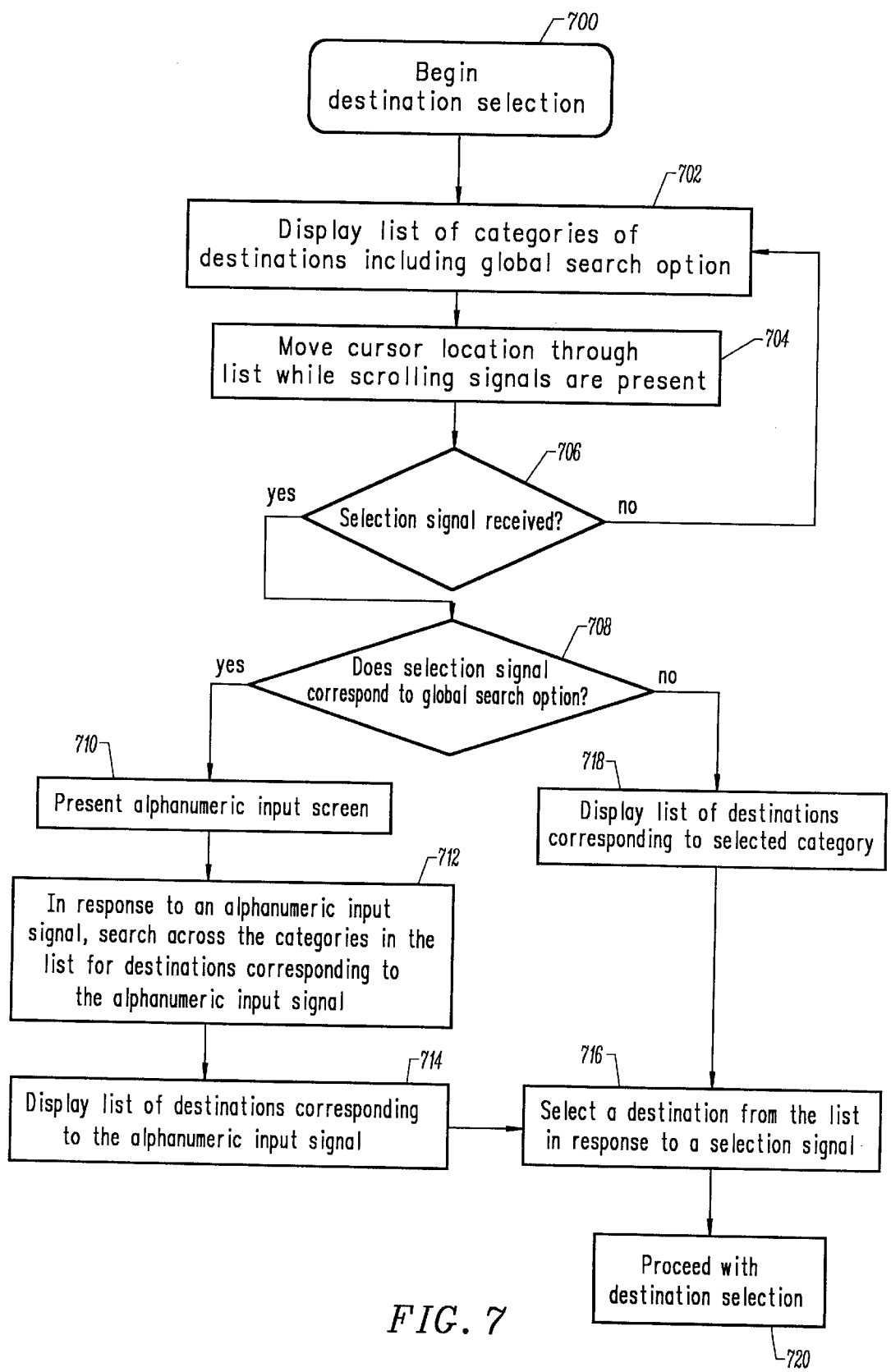
FIG. 7 is a flowchart illustrating a portion of a destination selection process in which the global search feature is employed.

FIG. 7 is a flowchart illustrating a portion of a destination selection process in which the global search feature is employed. Sometime after the destination selection process begins (step 700), a list of categories is displayed which includes a global search option with which the user may search for a particular destination across all of the categories in the list (step 702). In response to signals from the scrolling keys on the display console, the cursor position is moved through the displayed list (step 704). If a selection signal is received (step 706) and the selection signal corresponds to the global search option (step 708), the system presents an alphanumeric input screen by which the user may enter a string of characters and thereby transmit an alphanumeric input signal (step 710). The system then searches across the categories for destinations corresponding to the string of input characters (step 712) and displays any such destinations (step 714). In response to a selection signal, a currently highlighted one of these destinations is selected (step 716) and the destination selection process continues (step 720). If the global search option is not selected at step 708, a list of destinations corresponding to the selected category is displayed (step 718) from which the user may make a selection.

While the invention has been particularly shown and described with reference to specific embodiments thereof, it will be understood by those skilled in the art that the foregoing and other changes in the form and details may be made therein without departing from the spirit or scope of the invention.

What is claimed is:

1. A method for selecting a destination in a vehicle navigation system, the system comprising a display and a selection control, the method comprising the steps of:

selecting a first destination from a primary list of destinations in response to a selection signal generated by the selection control;

without user intervention, placing the first destination on a secondary list of destinations in response to the selecting step, the secondary list comprising previously selected destinations from the primary list; and for subsequent destination selections, presenting the primary list and the secondary list on the display thereby facilitating selection of destinations from both the primary and secondary lists.

2. The method of claim 1 wherein the selecting, placing and presenting steps are performed for a plurality of geographical features.

3. The method of claim 2 wherein the plurality of geographical features includes cities and streets, and wherein the selecting, placing and presenting steps are first performed for the cities.

4. The method of claim 1 wherein the destinations comprise cities.

5. The method of claim 1 wherein the destinations comprise streets.

6. The method of claim 1 wherein the destinations comprise points of interest.

7. The method of claim 1 wherein the presenting step simultaneously displays a portion of the primary list of destinations and a portion of the secondary list of destinations.

8. The method of claim 7 wherein the portion of the secondary list is displayed immediately adjacent the portion of the primary list, the portion of the primary list comprising destinations at the beginning of the primary list.

9. The method of claim 1 wherein the secondary list comprises a maximum number of destinations most recently selected from the primary list, and wherein placing the first destination on the secondary list comprises replacing one of the previously selected destinations in the secondary list.

10. The method of claim 1 wherein the secondary list is distinguishable from the primary list by at least one character attribute.

11. The method of claim 10 wherein the at least one character attribute comprises font type.

12. The method of claim 10 wherein the at least one character attribute comprises color.

13. A vehicle navigation system comprising:

a display;

a selection control;

means for selecting a first destination from a primary list of destinations in response to a selection signal generated by the selection control;

means for, without user intervention, placing the first destination on a secondary list of destinations in response to the selection of the first destination, the secondary list comprising previously selected destinations from the primary list; and means for presenting the primary list and the secondary list on the display thereby facilitating selection of destinations from both the primary and secondary lists.

14. A vehicle navigation system comprising:

a display;

a selection control; and a central processing unit (CPU) coupled to the display and selection control, the CPU being operable to:

select a first destination from a primary list of destinations in response to a selection signal generated by the selection control;

without user intervention, place the first destination on a secondary list of destinations in response to the selection of the first destination, the secondary list comprising previously selected destinations from the primary list; and present the primary list and the secondary list on the display and thereby facilitate selection of destinations from both the primary and secondary lists.

15. At least one computer readable medium containing program instructions for selecting a destination in a vehicle navigation system, the system comprising a display and a selection control, the at least one computer readable medium comprising:

computer readable code for selecting a first destination from a primary list of destinations in response to a selection signal generated by the selection control;

computer readable code for, without user intervention, placing the first destination on a secondary list of destinations in response to the selecting step, the secondary list comprising previously selected destinations from the primary list; and computer readable code for, for subsequent destination selections, presenting the primary list and the secondary list on the display thereby facilitating selection of destinations from both the primary and secondary lists.

* * * * *